United States Patent
Anderson, Jr. et al.

(10) Patent No.: US 9,592,639 B2
(45) Date of Patent: Mar. 14, 2017

(54) SYSTEM FOR CLEANING CART DRIVE COMPONENTS IN THREE-DIMENSIONAL OBJECT PRINTING SYSTEMS

(71) Applicant: Xerox Corporation, Norwalk, CT (US)

(72) Inventors: Robert B. Anderson, Jr., Syracuse, NY (US); Eliud Robles Flores, Rochester, NY (US); Paul F. Sawicki, Rochester, NY (US); Alicia S. Mruthyunjaya, Penfield, NY (US); Christopher D. Atwood, Webster, NY (US); Timothy P. Foley, Marion, NY (US); Elizabeth M. Crossen, Churchville, NY (US)

(73) Assignee: Xerox Corporation, Norwalk, CT (US)

( * ) Notice: Subject to any disclaimer, the term of this patent is extended or adjusted under 35 U.S.C. 154(b) by 133 days.

(21) Appl. No.: 14/693,006

(22) Filed: Apr. 22, 2015

(65) Prior Publication Data

US 2016/0311173 A1   Oct. 27, 2016

(51) Int. Cl.
*B29C 67/00* (2006.01)
*B33Y 40/00* (2015.01)
*B33Y 30/00* (2015.01)
*B33Y 10/00* (2015.01)

(52) U.S. Cl.
CPC ...... *B29C 67/0096* (2013.01); *B29C 67/0051* (2013.01); *B29C 67/0055* (2013.01); *B29C 67/0059* (2013.01); *B29C 67/0085* (2013.01); *B29C 67/0092* (2013.01); *B33Y 10/00* (2014.12); *B33Y 30/00* (2014.12); *B33Y 40/00* (2014.12)

(58) Field of Classification Search
CPC ............ B29C 67/0051; B29C 67/0055; B29C 67/0059; B29C 67/0085; B29C 67/0092; B29C 67/0096; B33Y 10/00; B33Y 30/00; B33Y 40/00
USPC ... 425/225, 232, 375, 174.4; 134/49, 122 R; 104/279
See application file for complete search history.

(56) References Cited

U.S. PATENT DOCUMENTS

| 2,765,547 A | 10/1956 | Dimmel et al. |
|---|---|---|
| 2,944,275 A * | 7/1960 | Markusen .............. A01D 33/00 101/425 |
| 4,116,555 A * | 9/1978 | Young .................. G03G 15/095 15/1.51 |
| 5,904,100 A | 5/1999 | Findley et al. |
| 6,191,507 B1 | 2/2001 | Peltier et al. |

(Continued)

FOREIGN PATENT DOCUMENTS

EP    2 474 418 B1    7/2012

*Primary Examiner* — Matthew Daniels
*Assistant Examiner* — Lawrence D Hohenbrink, Jr.
(74) *Attorney, Agent, or Firm* — Maginot Moore & Beck LLP (57) ABSTRACT

A cart that helps eliminate contaminants from a printing system with a rail support track includes a platform, a first bearing, and a first blade. The first bearing is operatively connected to the platform, and is positioned and configured to roll along a first cylindrical rail of a rail support track of a printing system to enable the platform to move along the first cylindrical rail. The first blade has a leading edge oriented at an acute angle relative to a curved surface of the first cylindrical rail, and is configured to engage the curved surface to remove contaminant as the cart moves along the first cylindrical rail.

14 Claims, 8 Drawing Sheets

(56) References Cited

U.S. PATENT DOCUMENTS

| | | | |
|---|---|---|---|
| 6,688,021 | B2 | 2/2004 | Baig et al. |
| 7,070,250 | B2 | 7/2006 | Lester et al. |
| 8,167,395 | B2 | 5/2012 | Fienup et al. |
| 8,288,004 | B2 | 10/2012 | Moorlag et al. |
| 8,692,011 | B2 | 4/2014 | Moorlag et al. |
| 8,851,664 | B2 | 10/2014 | Spence |
| 2007/0134035 | A1* | 6/2007 | Kageyama ......... G03G 21/0017 399/346 |
| 2011/0125307 | A1 | 5/2011 | Dickson et al. |
| 2012/0157277 | A1 | 6/2012 | Moorlag et al. |
| 2013/0293652 | A1 | 11/2013 | Spence et al. |
| 2013/0293653 | A1 | 11/2013 | Spence et al. |
| 2014/0125749 | A1* | 5/2014 | Spence .................... B41J 2/215 347/104 |

\* cited by examiner

SYSTEM FOR CLEANING CART DRIVE COMPONENTS IN THREE-DIMENSIONAL OBJECT PRINTING SYSTEMS

TECHNICAL FIELD

The system and method disclosed in this document relate to printers that produce three-dimensional objects and, more particularly, to cart drive mechanisms in such printers.

BACKGROUND

Digital three-dimensional manufacturing, also known as digital additive manufacturing, is a process of making a three-dimensional solid object of virtually any shape from a digital model. Three-dimensional printing is an additive process in which one or more printheads eject successive layers of material on a substrate in different shapes. Typically, ejector heads, which are similar to printheads in document printers, include an array of ejectors that are coupled to a supply of material. Ejectors within a single ejector head can be coupled to different sources of material or each ejector head can be coupled to different sources of material to enable all of the ejectors in an ejector head to eject drops of the same material. Materials that become part of the object being produced are called build materials, while materials that are used to provide structural support for object formation, but are later removed from the object are known as support materials. Three-dimensional printing is distinguishable from traditional object-forming techniques, which mostly rely on the removal of material from a work piece by a subtractive process, such as cutting or drilling.

Figure 7:
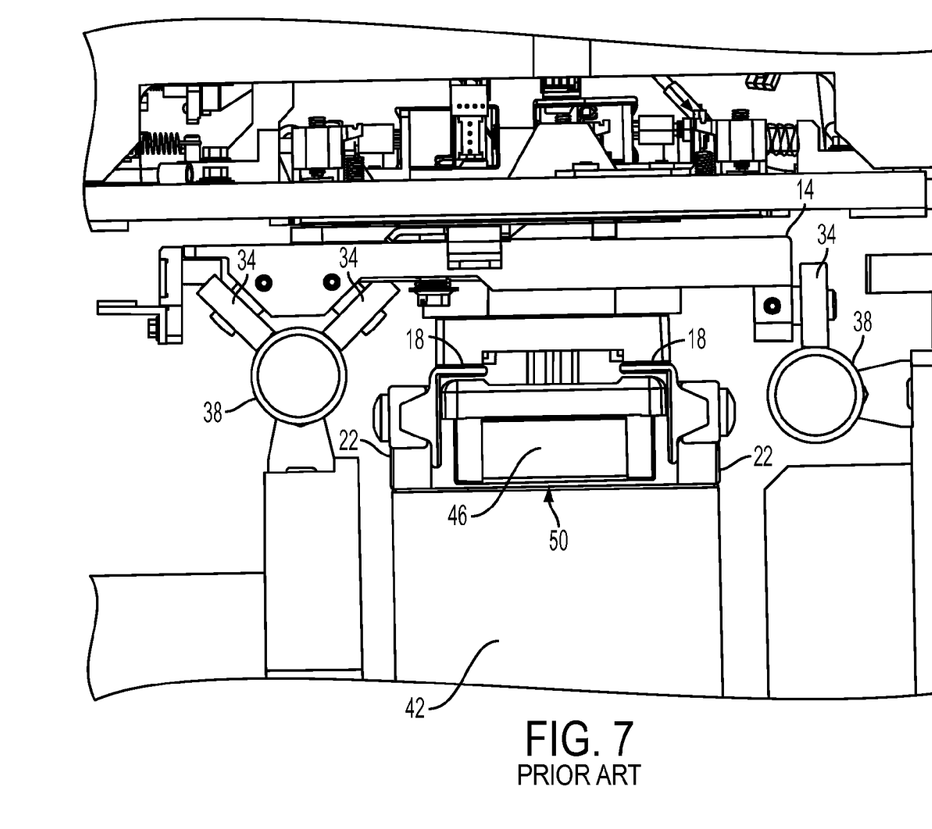
FIG. 7 is a front view of an exemplary embodiment of a cart for a prior art printing system.
Figure 8:
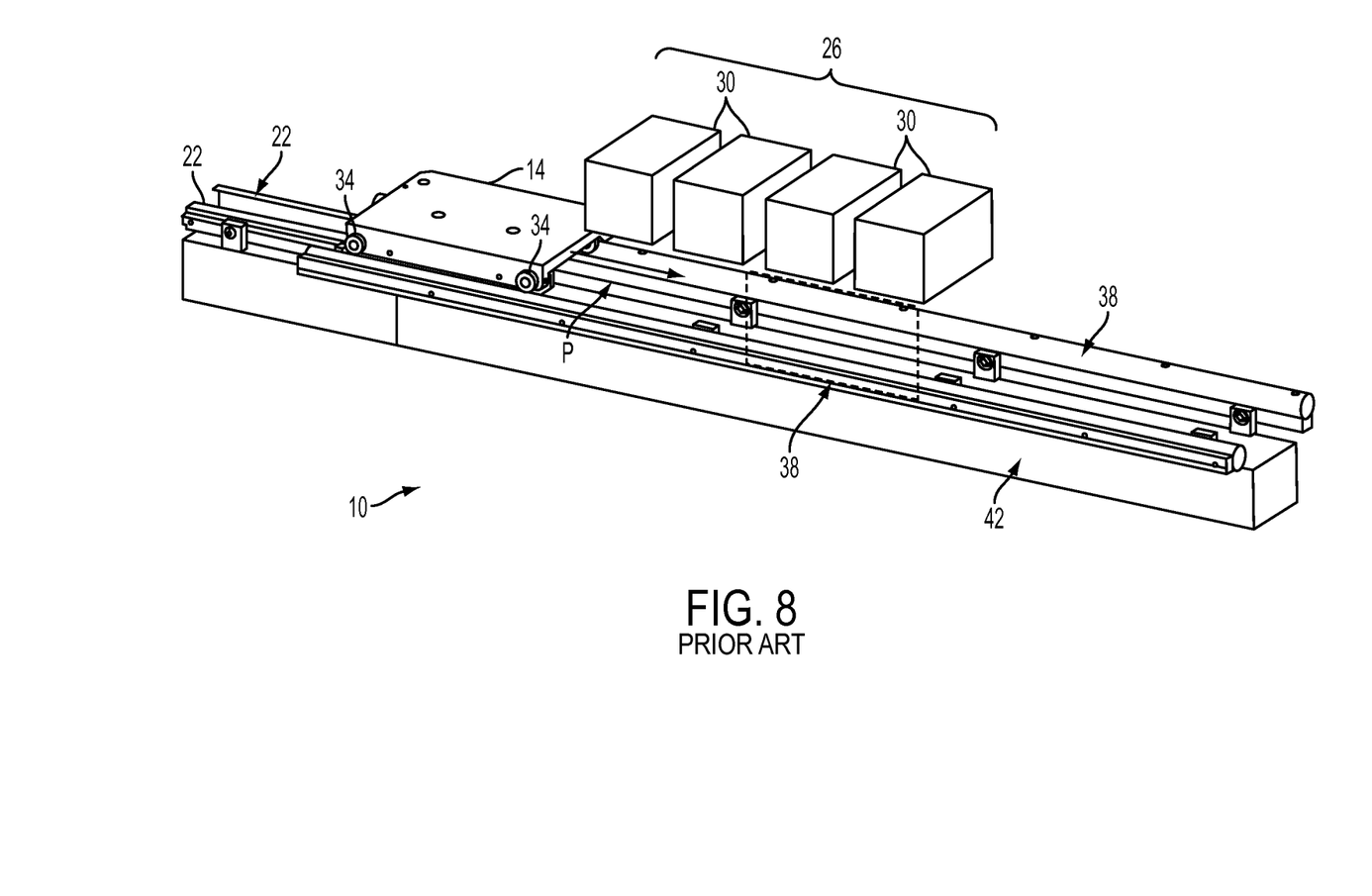
FIG. 8 is a perspective view of an exemplary embodiment of a prior art printing system.

A previously known three-dimensional object printing system 10 is shown in FIG. 8. In the view depicted in that figure, a platform 14, called a cart, includes surfaces 18 (FIG. 7) that slide upon track rails 22 to enable the cart to move in a process direction P between printing stations, such as the printing station 26 shown in FIG. 8. Alternatively, carts can include wheels configured to roll along tracks, or other types of acceptable mobility mechanisms. The rails 22 terminate at a position underneath the cart 14 as shown in FIG. 8. Printing station 26 includes four ejector heads 30 as shown in the figure, although fewer or more ejector heads can be used in a printing station. Once the cart 14 reaches the printing station 26, the cart 14 transitions to precision rails 38, which begin at the termination of the rails 22, to enable bearings 34 to roll upon precision rails 38. Precision rails 38 are cylindrical rail sections that are manufactured within tight tolerances to help ensure accurate placement and maneuvering of the cart 14 beneath the ejector heads 30. The rails 38 terminate past the printing station 26, as shown in FIG. 8, where another set of rails 22 (not shown) begin and then lead to the next printing station. Linear electrical motors are provided within housing 42 to interact with a magnet positioned with housing 46 connected to the lower surface of the cart 14, as described below, to propel the cart as the surfaces 18 slide along the track rails 22 and then, once the bearings 34 transition to the precision rails 38, maneuver the cart 14 on the precision rails. As the cart 14 moves on the rails 38 past the printing station 26, the printheads eject material onto the upper surface of the cart in synchronization with the motion of the cart. Additional motors (not shown) move the printing station 26 vertically with respect to the cart 14 and in an X-Y plane parallel to the upper surface of the cart as layers of material accumulate to form an object. Alternatively, a mechanism can be provided to move an upper surface of the cart 14 on which the object is being formed vertically and in the X-Y plane to enable the layers to form the object. Once the printing to be performed by a printing station is finished, the cart 14 is moved to another printing station for further part formation, layer curing or other processing.

An end view of the system 10 is shown in FIG. 7. That view depicts in more detail the surfaces 18 on which the cart 14 slides the track rails 22. Bearings 34 of the cart 14 are positioned on the precision rails 38 in an arrangement that facilitates accurate positioning of the build platen on the cart 14. Specifically, bearings 34 are positioned at a right angle to one another on one of the rails 38 to remove 4 degrees of freedom of the cart 14, while the other bearing 34 rests on the other rail 38 to remove one more degree of freedom. Linear motors within the housing 42 generate electromagnetic fields that interact with the magnet in housing 46 to move the cart 14 over an upper surface 50 of the housing 42. Gravity and magnetic attraction between the linear motors and the magnet hold the bearings 34 in contact with the rails 38.

When carts are not present underneath the ejector heads 30, errant drips of materials can fall from the ejector heads and produce undesired debris and contamination on the precision rails 38, track rails 22, and the housing 42. In order to produce three-dimensional objects with acceptable quality, the motion of the cart 14 beneath the ejector heads 30 needs to be precise. If materials from the ejector heads collect where the bearings 34 interface with the precision rails, the linear velocity of the cart is disrupted and the quality of the printed object is affected. Additionally, the collection of material drops on top of the housing 42 may affect the dissipation of heat from the motors and impact the performance and reliability of the motors. Therefore, improvements in three-dimensional printing systems that help eliminate the contamination on the precision rails and motor housing that affects the accuracy of the placement and movement of the cart would be beneficial.

Devices have been produced that enable clearing of undesirable material from tracks. Metal flaps and plows positioned in front of wheels on a railroad engine have been used to clear materials such as ice and snow from railroad tracks. Wipes or cleaning tissues affixed to an underside of model trains have also been used to wipe undesired materials from model railroad tracks. However, such techniques are not optimized for use in removing materials used in three-dimensional printing, which may solidify or cure after being ejected. Such techniques are also not adapted to cleaning curved surfaces. Hand-tools having a curved edge adapted to scrape a curved surface have been produced, but such hand-tools are not optimized for cleaning materials used in three-dimensional printing or for cleaning along a continuous track.

SUMMARY

An improved cart that helps eliminate the collection of materials from the ejector heads and other debris includes a platform, a first bearing operatively connected to the platform, and a first blade mounted to the platform. The first bearing is configured to roll along a first cylindrical rail of a rail track to enable the platform to move along the first cylindrical rail. The first blade has a leading edge that is oriented at an acute angle relative to the curved surface of the first cylindrical rail and is positioned to engage a curved surface of the first cylindrical rail as the first bearing rolls along the first cylindrical rail.

A three-dimensional object printing system that incorporates improved carts includes a rail track, a printing station disposed along the rail support track, and a cart movable along the rail support track. The rail track includes a first cylindrical rail that extends over at least a portion of the rail support track in a region of the printing station, and the printing station is configured to eject print media. The cart includes a platform, a first bearing operatively connected to the platform, and a first blade mounted to the platform. The first bearing is configured to roll along a first cylindrical rail of the rail track to enable the platform to move along the first cylindrical rail. The first blade has a leading edge that is oriented at an acute angle relative to the curved surface of the first cylindrical rail and is positioned to engage a curved surface of the first cylindrical rail as the first bearing rolls along the first cylindrical rail.

A method of removing contaminant from a rail track of a three-dimensional object printing system includes arranging a cart on the rail track. The cart includes a platform, a first bearing operatively connected to the platform, and a first blade mounted to the platform. The first bearing is configured to roll along a first cylindrical rail of the rail track to enable the platform to move along the first cylindrical rail. The first blade has a leading edge that is oriented at an acute angle relative to the curved surface of the first cylindrical rail and is positioned to engage a curved surface of the first cylindrical rail as the first bearing rolls along the first cylindrical rail. The method further includes moving the cart along the rail track such that the leading edge of the first blade engages with a curved surface of the first cylindrical rail, and passing the cart over a portion of the first cylindrical rail having a contaminant positioned thereon such that the first blade engages and dislodges the contaminant from the first cylindrical rail.

BRIEF DESCRIPTION OF THE DRAWINGS

The foregoing aspects and other features of a cart that helps eliminate the collection of materials from the ejectors heads and other debris are explained in the following description, taken in connection with the accompanying drawings.

DETAILED DESCRIPTION

Figure 1:
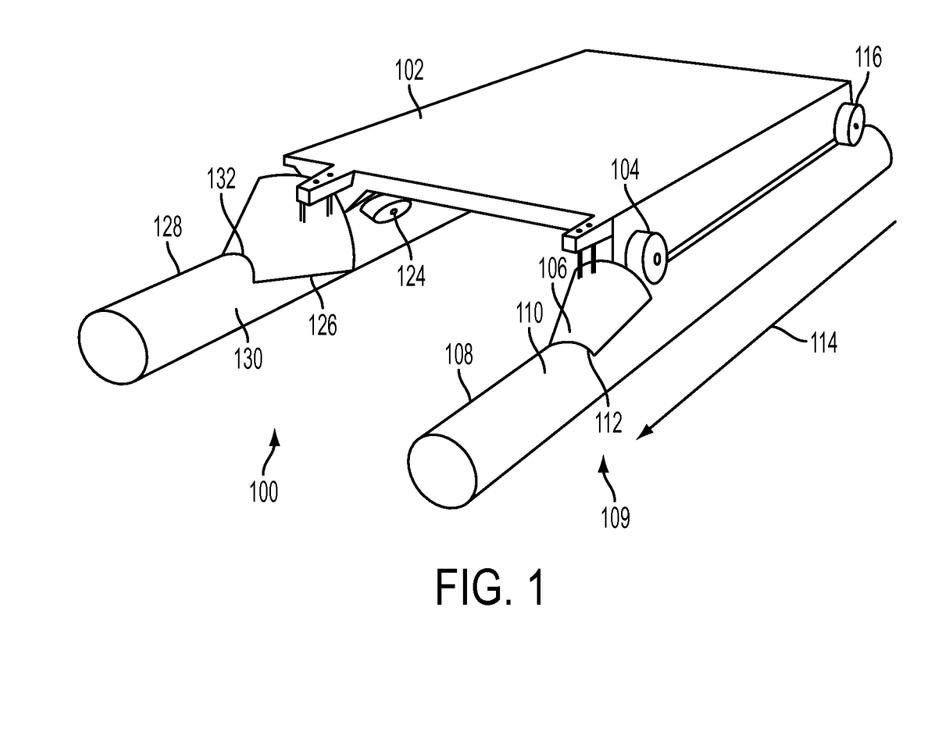
FIG. 1 is a perspective view of an exemplary embodiment of a cart for a printing system according to the disclosure.

For a general understanding of the environment for the system and method disclosed herein as well as the details for the system and method, reference is made to the drawings. In the drawings, like reference numerals designate like elements FIG. 1 depicts an improved cart 100 that helps eliminate contaminants from a printing system with a rail support track. The cart 100 includes a platform 102 having a plurality of bearings 104, 116 and 124 mounted to the platform as well as a pair of blades 106 and 126. The bearings are configured to roll along cylindrical rails 108 and 128 of a rail support track 109. These rails correspond to the precision rails 38 of the printing system shown in FIG. 8 discussed above. The blades 106 and 126 have leading edges 112 and 132, respectively, which engage the curved surfaces 110 and 130 of the rails 108 and 128, respectively, as the cart 100 moves along the rails. These blades remove contaminant from the cylindrical rails 108 and 128 as the cart moves along the rails in a process direction 114. As noted above with respect to FIG. 8, the motors that enable the cart to move along the rails are located within a motor housing positioned below the rail track 109. A magnet housed within the cart 100 is not shown in FIG. 1 for the purpose of clarity. Other appropriate propulsion mechanisms are also contemplated. While the blades 106, 126 are positioned in front of the bearings 104, 124 in FIG. 1, other positions of the blades 106, 126 are also contemplated such as, for example, blades positioned behind the platform 102 in the process direction 114.

In another embodiment (not shown), the cart 100 comprises at least one additional blade mounted to the platform 102 and positioned to engage a curved surface 110 of the first cylindrical rail 108 or a curved surface 130 of the second cylindrical rail 128 as the cart 100 moves in the process direction 114. In one example, a plurality of blades is closely packed together into a blade assembly similar to a multi-bladed razor. In another example, at least one additional blade is positioned behind the first or second blade 106, 126, such as being positioned behind the platform 102 in the process direction 114.

Figure 2:
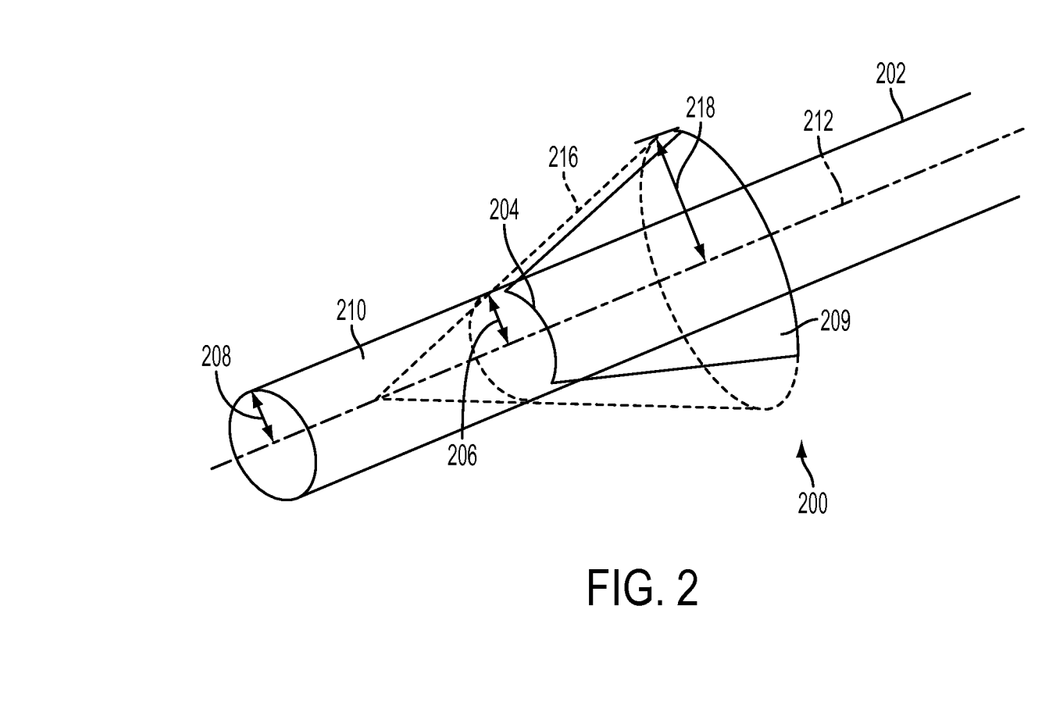
FIG. 2 is a perspective view of an exemplary embodiment of a blade for a cart according to the disclosure.
Figure 3:
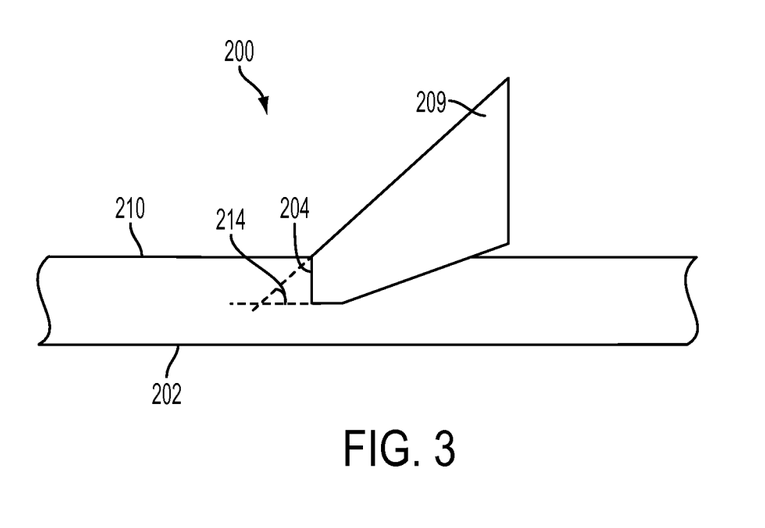
FIG. 3 is a side view of the blade illustrated in FIG. 2.

FIG. 2 illustrates a perspective view of an exemplary embodiment of a blade 200 that can be used to implement the blades 106 and 126 of FIG. 1. FIG. 3 is a side view of the blade 200 of FIG. 2. The blade 200 is engaged with a cylindrical rail 202. As illustrated in FIG. 2, the blade 200 has a body 209 having a shape of a truncated cone that terminates at one end into a curved leading edge 204 having a radius 206, which is substantially the same as radius 208 of a cylindrical surface 210 of the cylindrical rail 202. The body 209 of the blade 200 and the cylindrical rail 200 share a central axis 212. The curved leading edge 204 of the body 209 is configured to mate with the cylindrical surface 210 of the rail 202 when the blade 200 is engaged with the cylindrical rail 202 to enable close contact between the blade 200 and the cylindrical rail 202 to be maintained while the blade 200 moves along the cylindrical rail 202.

As shown in FIG. 3, the curved leading edge 204 is oriented at an acute angle 214 relative to the cylindrical surface 210 to enable the blade 200 to remove contaminant from the cylindrical rail 202. As the blade 200 moves along the cylindrical rail 202, the acute angle 214 enables the blade 200 to operate as a scraper in addition to acting as a plow. In other words, in addition to merely pushing contaminant away from the blade 200, the blade 200 is operable to scrape against the cylindrical surface 210 in order to apply a shear force to dislodge contaminant that may have solidified or bonded to the cylindrical surface 210. In an example, the acute angle 214 is in a range from about 20 degrees to about 70 degrees, or more particularly, about 30 degrees. The acute angle 214 can be optimized for dislodging different materials. For example, a more malleable material may be optimally dislodged by a blade oriented at a larger angle such that the blade operates more with a plow function, while a less malleable material may be optimally dislodged by a blade oriented at a smaller angle such that the blade operates more with a scraper function.

Returning to FIG. 2, the radius of the blade 200 increases with increasing distance from the curved leading edge 204. In other words, the blade 200 smoothly transitions from the radius 206 of the curved leading edge 204 to a larger radius 218 defining a rear edge of the blade 200. The smooth transition enables contaminant to be dislodged from the cylindrical surface 210 without collecting on the blade 200. In an embodiment (not shown) the blade additionally includes grooves, ridges, corrugation, or other surface features configured to guide contaminant dislodged from the cylindrical surface 210 off of the blade 200. A distance from the curved leading edge 204 to the rear edge of the blade 200 can be optimized for such factors as weight of the blade, material to be dislodged, desired rigidity of the blade 200, or other factors.

In an embodiment, the blade 200 essentially consists of a material having an elastic modulus that is less than an elastic modulus of the cylindrical rail. For example, in a printing system using cylindrical rails that include stainless steel, the blade can be formed from materials such as aluminum, brass, bronze, plastics, or the like. The blade 200 can be formed, for example, by a stamping operation, such that a plurality of blades can be formed during a single operation. Other conventional manufacturing processes are also contemplated.

Over time, material from the blade 200 can be worn away due to the close contact between the curved leading edge 204 and the cylindrical surface 210 or another cylindrical surface with a similar radius, such as a preconditioning surface. This wear can improve the close contact between the curved leading edge 204 and the cylindrical surface 210, for example, by removing a defect in the blade 200 due to manufacturing. The wear can also keep the blade 200 sharp throughout its operation. Extensive wear of material of the blade, however, may necessitate replacement of the blade. In one embodiment, the blade 200 includes a wear indicator (not shown) embodied as, for example, a ridge identifying a wear limit in the blade 200, or an indicator (not shown) that becomes visible when the blade 200 has been worn down by a predetermined amount.

Figure 4:
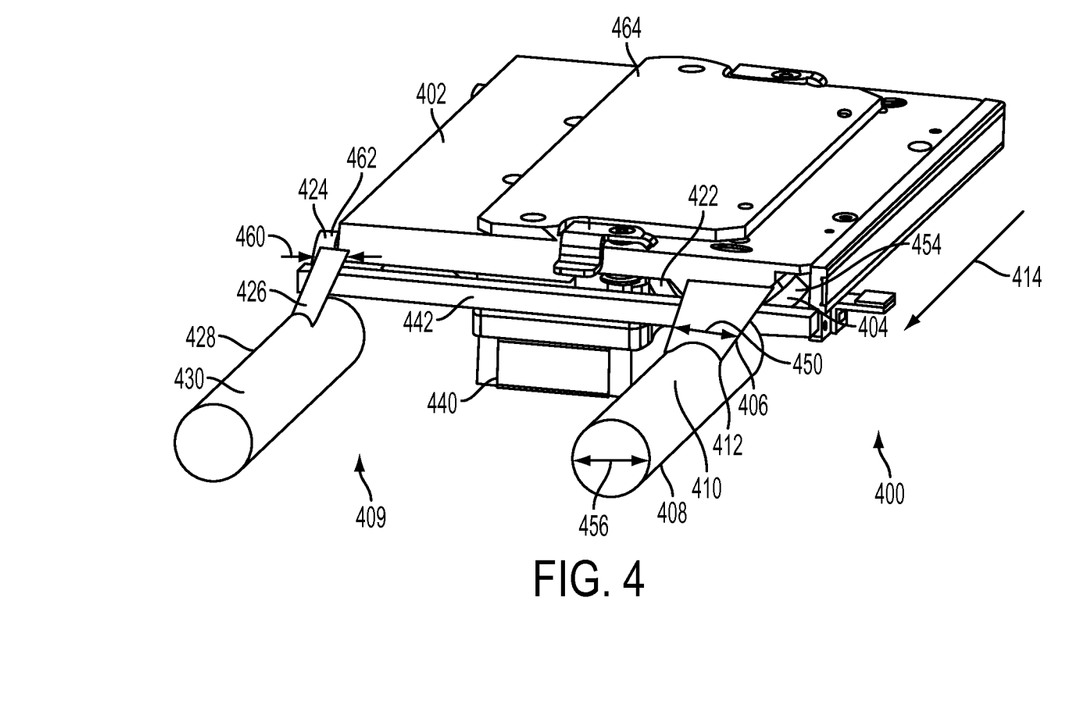
FIG. 4 is a perspective view of another embodiment of a cart for a printing system according to the disclosure.

FIG. 4 illustrates another exemplary embodiment of a cart 400 that helps eliminate contaminants from a printing system with a rail support track. The cart 400 includes a platform 402 to which bearings 404, 422 and 424 have been mounted as well as blades 406 and 426 and a central support member 440 with a mounting bracket 442. The platform 402 enables forming three-dimensional print media thereon, or can enable mounting of a maintenance device thereon that includes, for example, a wiper configured to clean a face of a printhead. The bearings 404, 422 and 424 enable the cart 400 to roll along the cylindrical rails 408 and 428 of rail support track 409 in a process direction 414. The mounting bracket 442 is configured for the mounting of the blades 406 and 426 to the platform 402.

In the embodiment illustrated in FIG. 4, the mounting bracket 442 is a linear member oriented substantially perpendicular to the process direction 414. The mounting bracket 442 can be implemented, for example, with a steel bar welded, bolted, snapped, or otherwise affixed to the platform 402. The mounting bracket 442 enables the blades 406, 426 to be mounted to the cart 400 without interfering with the space on platform 402 or with materials or objects located on the platform. The blades 406 and 426 are configured and positioned to engage the cylindrical rails 408 and 428, respectively, as described above with regard to FIG. 1 to FIG. 3 in order to dislodge contaminant from the rails 408 and 428, respectively.

As illustrated in FIG. 4, blades for use with the cart 400 can be of different widths. The first blade 406, for example, is a wide blade that has a width 450 that is greater than a width of a surface 454 of the bearing 404, which is configured to contact the cylindrical rail 408 and that is less than or equal to a diameter 456 of the cylindrical rail 408. In an example, the first blade 406 has a width 450 to enable the leading edge 412 to engage a portion of the cylindrical surface 410 contacted by bearing 404 and a bearing 422 that is positioned at a right angle to bearing 404. In other words, the width 450 of the first blade 406 extends over at least 90 degrees of the circumference of the cylindrical rail 408 to attenuate any need for individual blades for each bearing in the complementary set. A wider blade width enables the first blade 406 to engage a wider swath of the cylindrical rail 408 and increase the portion of the cylindrical rail 408 that can be cleared of contaminant. The wider blade width also increases the extent of the contact between the leading edge 412 of the first blade 406 and the curved surface 410 of the cylindrical rail 408. This configuration, however, increases drag resistance that acts on the cart 400 when the cart 400 moves in the process direction as well as a weight of the first blade 406.

In another example, the second blade 426 is a thin blade having a width 460 that is substantially equal to a width of a surface 462 of the second bearing 424 configured to contact the cylindrical rail 428. Since the width 460 is substantially equal to the width of a surface 462 of the second bearing 424, the portion of the curved surface 430 of the second cylindrical rail 428 contacted by the second bearing 424 is free of contaminant so the weight of the second blade 426 and the drag resistance is minimized. While the widths 450, 460 of the first and second blades 406, 426, as illustrated in FIG. 4 are different, the first and second blades 406, 426 in other embodiments can have substantially equal widths.

Figure 5:
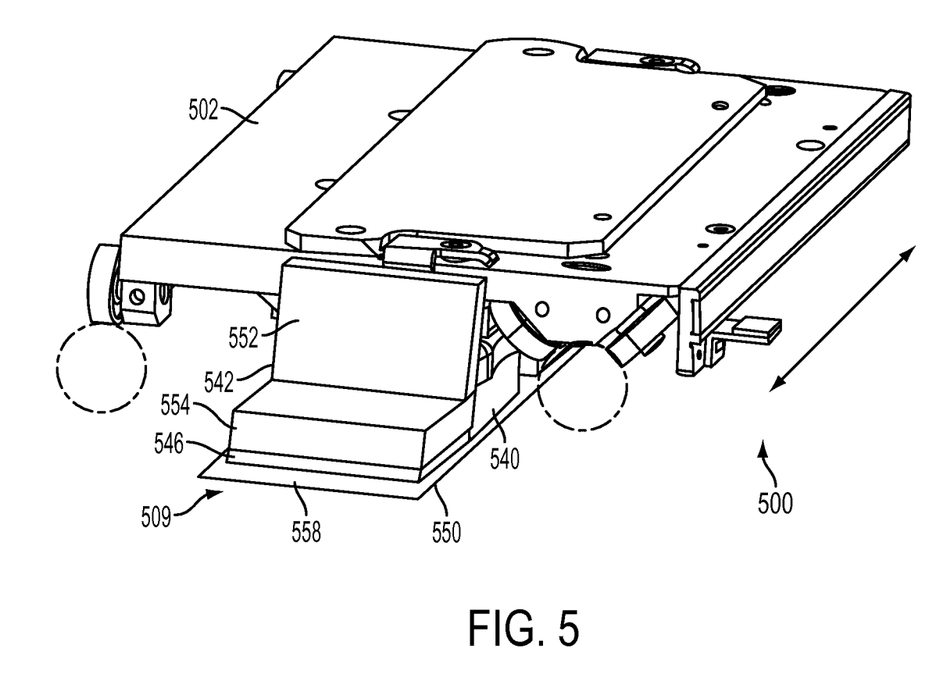
FIG. 5 is a perspective view of a further embodiment of a cart for a printing system according to the disclosure.

FIG. 5 illustrates an embodiment of a cart 500 wherein a mounting bracket 542 is connected to the platform 502. In FIG. 5, the blades, rail tracks, and the cylindrical rails are not shown in order to illustrate other features of the cart 500. The mounting bracket 542 is configured to slide over a track 550 of a rail support track 509. A drive member 540 is positioned between the cylindrical rails, and can include, for example, a magnet, sliding surfaces or wheels configured to move along the track 550, such as the magnets, sliding surfaces 18 and tracks 22 discussed above with regard to FIG. 7.

The mounting bracket 542 is configured to extend down between rail tracks, such as the rail tracks 22 illustrated in FIG. 7. Bracket 542 further includes a first plate 552 configured to mount, for example, a bar usable to mount the blades to the platform 502, and also includes a second plate 554, which is configured to connect the mounting bracket 542 to the central support member 540. A pad 546 is mounted to plate 554 to position the pad between the track 550 and the mounting bracket 542. Other configurations for the mounting bracket 542 are also contemplated, such as a single plate. The pad 546 is positioned and configured to engage a surface 558 of the track housing 550 (analogous to the surface 50 in FIG. 7) in order to remove contaminant as the cart 500 moves along the track 550. In an embodiment, the pad 546 includes a brush or wipe, and can include materials such as, for example, cotton, nylon, and a metal mesh. The materials of the pad 546 and the position of the pad 546 in relation to the platform 502 can be optimized for removal of different types of contaminants.

Figure 6:
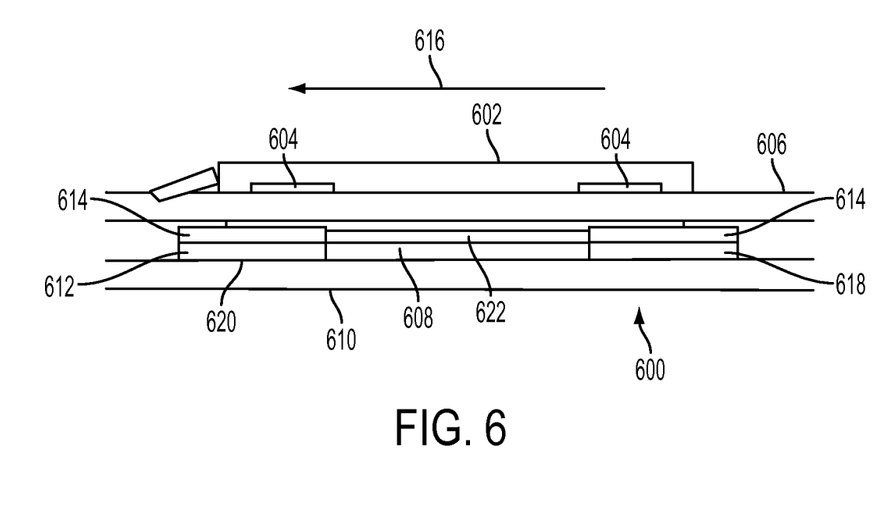
FIG. 6 is a side view of an exemplary embodiment of a cart for a printing system according to the disclosure.

FIG. 6 illustrates a side view of a cart 600 that includes a platform 602, bearings 604 that enable the cart 600 to move along a cylindrical rail 606, and a support member 608 that is configured to slide along rails, such as the rails 22 illustrated in FIG. 7, which are mounted to and extend above housing 610. Each of the pads 612 and 618 are urged against a top surface of the housing 610 by a biasing member 614. In FIG. 6, rail supports, such as the rails 22 have been omitted for the purpose of clarity, but would extend above the housing 610 as illustrated in FIG. 7 to engage with slide surfaces 622 (18 in FIG. 7) of the support member 608.

In one embodiment, the pad 612 includes an aggressive metal mesh that is positioned in front of the platform 602 in the process direction 616, and the pad 618 includes a soft material, such as cotton, that is positioned behind the platform 602 in the process direction 616 in order to clear materials remaining on the housing 610 after the cart 600 has passed. The reader should understand that, in different embodiments, multiple pads can be positioned at different locations relative to the platform 602, and that each of the pads can have different materials. In one embodiment, the pad 618 and its associated biasing member 614 are omitted. In another embodiment (not shown), pad 612 has a first region with a first material, such as metal mesh, and a second region with a second material, such as cotton, and is positioned, for example, between a central portion of the platform 602 and the housing 610.

Facilitating a positive surface contact between pad 612 and surface 620 of the housing 610 is beneficial for removing contaminants with the pad 612. To further improve that contact, a biasing member 614 is positioned between the pad 612 and the support member 608. The biasing member 614 can be, for example, a spring, a weight, or another type of conventional biasing member. In one embodiment, the biasing member is configured to ensure the materials of the pad 612 provide an interference fit between the pad 612 and the housing 610. In one embodiment, the slide surface 622 includes or is defined by an additional pad configured to wipe the surfaces of the rail support tracks.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A cart that moves through in a printing system, the cart comprising:
   a platform;
   a first bearing operatively connected to the platform, the first bearing being configured to roll along a first cylindrical rail of the printing system to enable the platform to move along the first cylindrical rail; and
   a first blade that is mounted to the platform and positioned to engage a curved surface of the first cylindrical rail as the first bearing rolls along the first cylindrical rail, the first blade having a leading edge that is oriented at an acute angle relative to the curved surface of the first cylindrical rail and the leading edge of the first blade being a curved edge with a radius substantially similar to a radius of the first cylindrical rail to enable the first blade to remove contaminant from the first cylindrical rail, the first blade having a shape of a radial section of a truncated cone with a radius of the first blade increasing with distance from the leading edge of the first blade.

2. The cart of claim 1 further comprising:
   a second bearing operatively connected to the platform, the second bearing being configured to roll along a second cylindrical rail of the printing system that is parallel to the first cylindrical rail to enable the platform to move through the printing system; and
   a second blade that is mounted to the platform and positioned to engage a curved surface of the second cylindrical rail as the second bearing rolls along the second cylindrical rail, the second blade having a leading edge that is oriented at an acute angle relative to the curved surface of the second cylindrical rail to enable the second blade to remove contaminant from the second cylindrical rail.

3. The cart of claim 1 wherein a central axis of the first blade is collinear with a longitudinal axis of the first cylindrical rail when the first bearing engages the first cylindrical rail.

4. The cart of claim 1 wherein the first blade has an elastic modulus that is less than an elastic modulus of the first cylindrical rail.

5. The cart of claim 1 wherein a defect in the leading edge of the first blade is configured to be removed such that the first blade achieves a close fit with the curved surface of the first cylindrical rail by wearing the first leading edge against the first cylindrical rail.

6. The cart of claim 1 wherein the first blade essentially consists of aluminum, brass, bronze, or plastic.

7. The cart of claim 1 wherein the leading edge of the first blade has a width that is substantially equal to a width of a surface of the first bearing configured to contact the first cylindrical rail.

8. The cart of claim 1 wherein the leading edge of the first blade has a width that is greater than a width of a surface of the first bearing configured to contact the first cylindrical rail and that is less than or equal to a diameter of the first cylindrical rail.

9. The cart of claim 1 wherein the platform includes a print media surface configured to receive a print media ejected from a printhead of the printing system that is disposed along the first cylindrical rail.

10. The cart of claim 1 further comprising:
    a maintenance device configured to clean a face of a printhead as the cart moves along the first cylindrical rail and the second cylindrical rail.

11. A cart that moves through in a printing system, the cart comprising:
    a platform;
    a first bearing operatively connected to the platform, the first bearing being configured to roll along a first cylindrical rail of the printing system to enable the platform to move along the first cylindrical rail;
    a first blade that is mounted to the platform and positioned to engage a curved surface of the first cylindrical rail as the first bearing rolls along the first cylindrical rail, the first blade having a leading edge that is oriented at an acute angle relative to the curved surface of the first cylindrical rail to enable the first blade to remove contaminant from the first cylindrical rail; and
    a mounting bracket connected to the platform and positioned between the first cylindrical rail and a second cylindrical rail, and to which the first blade is mounted, the mounting bracket having a first pad mounted on a bottom surface of the mounting bracket and a second pad mounted on the bottom surface of the mounting bracket, the second pad being substantially formed from a material that is different from a material of the first pad.

12. The cart of claim 11 further comprising:
a biasing member positioned between the first pad and the mounting bracket to enable the first pad to be biased against a surface of a housing in the printing system.

13. A printing system comprising:
a rail track;
a printing station configured to eject print media, the printing station disposed along the rail track, the rail track having a first cylindrical rail that extends over at least a portion of the rail track in a region of the printing station;
a cart movable along the rail track that includes:
a platform;
a first bearing operatively connected to the platform, the first bearing being configured to roll along the first cylindrical rail to enable the platform to move along the first cylindrical rail; and
a first blade that is mounted to the platform and positioned to engage a curved surface of the first cylindrical rail as the first bearing rolls along the first cylindrical rail and the leading edge of the first blade being a curved edge with a radius substantially similar to a radius of the first cylindrical rail, the first blade having a leading edge that is oriented at an acute angle relative to the curved surface of the first cylindrical rail to enable the first blade to remove contaminant from the first cylindrical rail, the first blade having a shape of a radial section of a truncated cone with a radius of the first blade increasing with distance from the leading edge of the first blade.

14. The printing system of claim 13 wherein:
the rail track further includes a second cylindrical rail parallel with the first cylindrical rail; and
the cart further includes:
a second bearing operatively connected to the platform, the second bearing being configured to roll along the second cylindrical rail to enable the platform to move through the printing system; and
a second blade that is mounted to the platform and positioned to engage a curved surface of the second cylindrical rail as the first bearing rolls along the first cylindrical rail, the second blade having a leading edge that is oriented at an acute angle relative to the curved surface of the second cylindrical rail to enable the second blade to remove contaminant from the second cylindrical rail.

* * * * *